United States Patent [19]
Anderson et al.

[11] 3,820,421
[45] June 28, 1974

[54] APPARATUS FOR SKIVING AND CLEANING REINFORCED HOSE

[75] Inventors: Michael L. Anderson, Marquette Heights; Harold Wayne Fowler, Brimfield; David Alexander McKie, East Peoria, all of Ill.

[73] Assignee: Caterpillar Tractor Co., Peoria, Ill.

[22] Filed: July 12, 1973

[21] Appl. No.: 378,718

[52] U.S. Cl. .................................. 82/20, 82/4 C
[51] Int. Cl. ....................... B23b 5/00, B23b 3/22
[58] Field of Search ................................ 82/20.4 C

[56] References Cited
UNITED STATES PATENTS

| | | | |
|---|---|---|---|
| 860,921 | 7/1907 | Krepp | 82/20 |
| 1,800,925 | 4/1931 | Blood | 82/20 X |
| 2,288,578 | 6/1942 | Yeomans et al. | 82/20 |
| 2,289,167 | 7/1942 | Bannister et al. | 82/20 |
| 2,582,279 | 1/1952 | Reimschissel | 82/20 X |
| 2,641,944 | 6/1953 | Laffoon | 82/4 C X |

*Primary Examiner*—Harrison L. Hinson
*Attorney, Agent, or Firm*—Phillips, Moore, Weissenberger, Lempio & Strabala

[57] ABSTRACT

Apparatus for simultaneously cleaning and skiving reinforced hose including vacuum means for removing particulate matter from the interior of the hose. Rotating cutter means are provided for skiving an exterior covering layer from said hose. The hose is mounted in longitudinally moveable clamping means and fed into the longitudinally fixed rotary cutters and vacuuming means.

16 Claims, 7 Drawing Figures

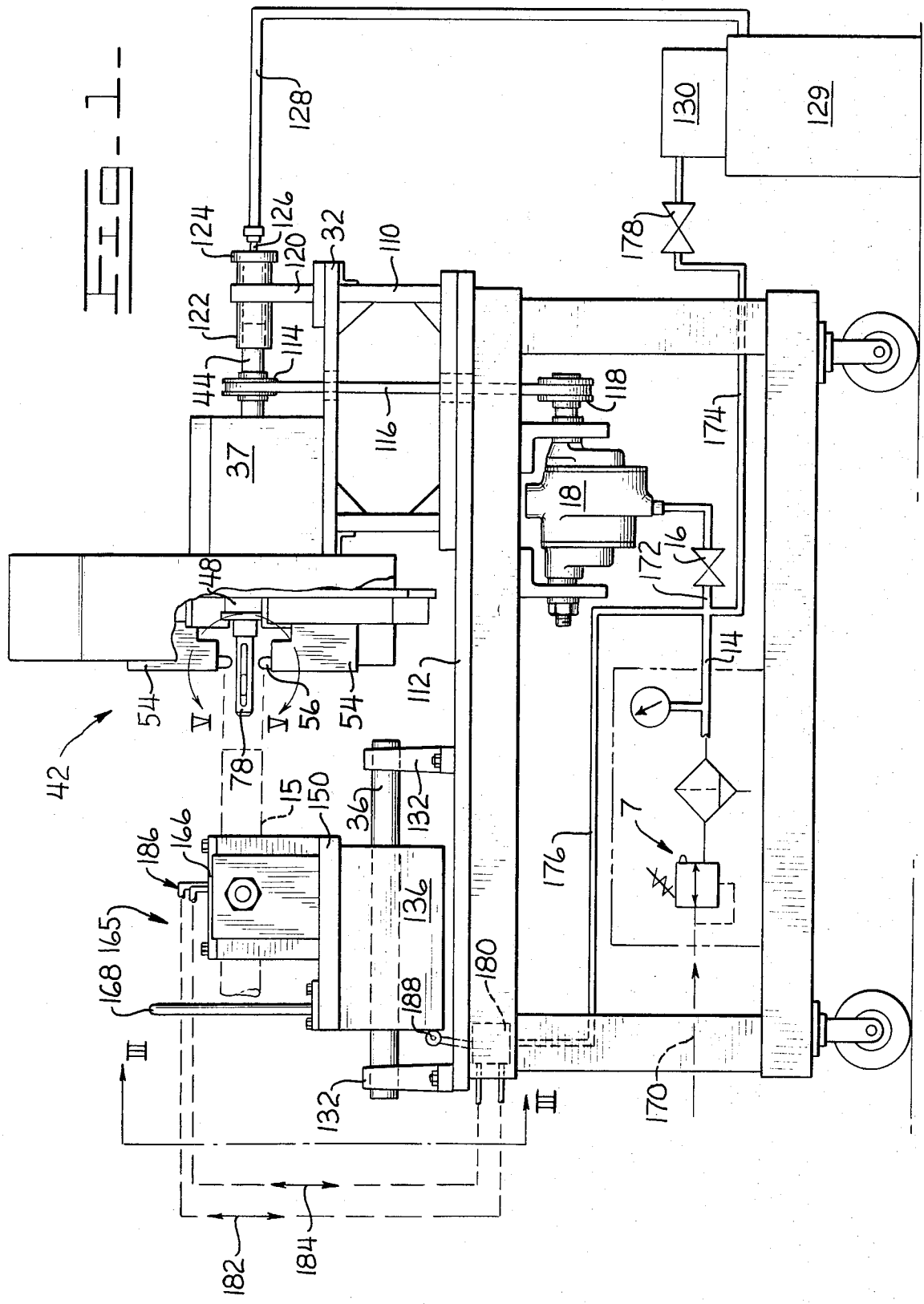

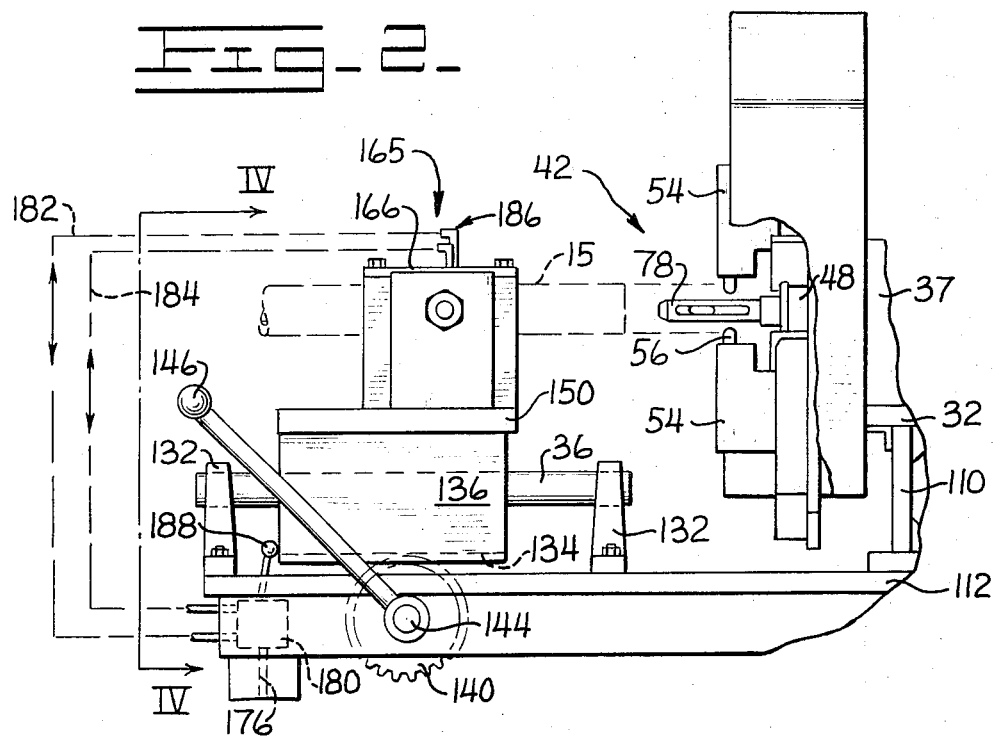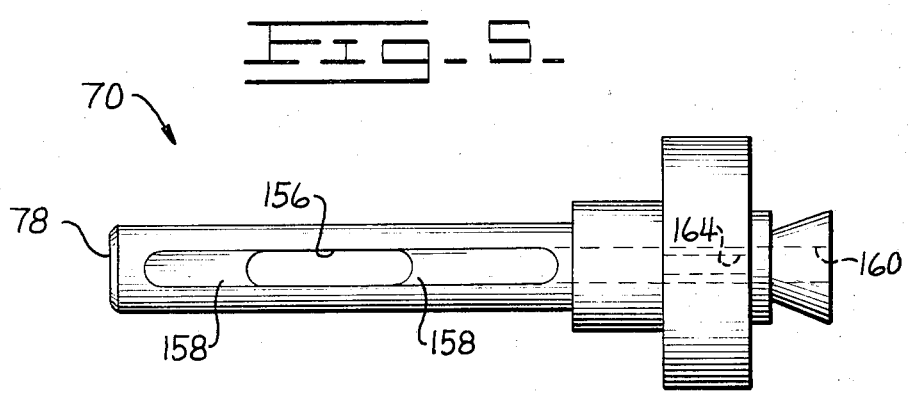

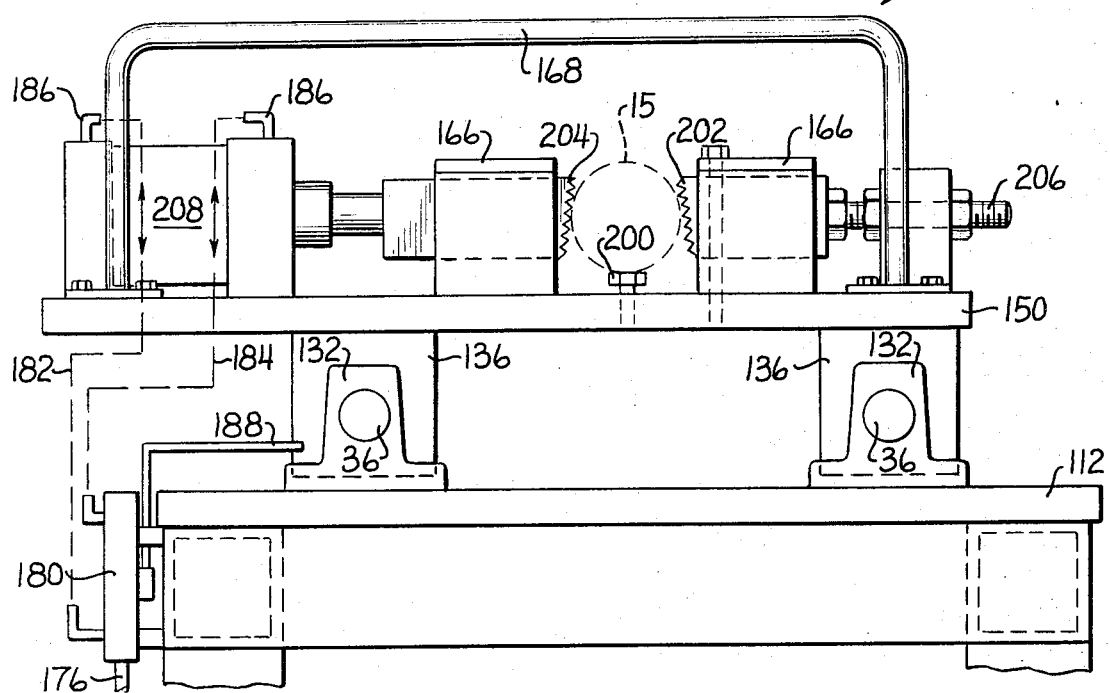
Fig-3-
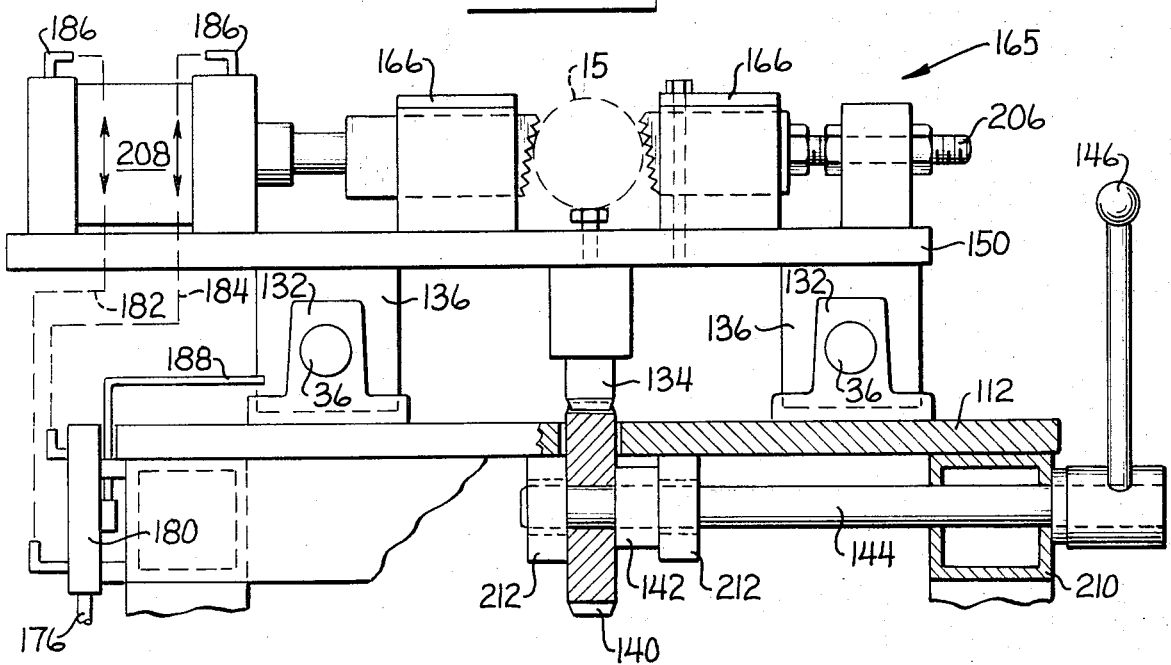
Fig-4-

APPARATUS FOR SKIVING AND CLEANING REINFORCED HOSE

CROSS REFERENCE TO RELATED APPLICATIONS

This application relates to and presents an improvement over the invention disclosed in U.S. Patent Application Ser. No. 209,628, filed on Dec. 20, 1971 by Christian A. Rassi and Lionel P. Dick, of common assignment herewith and entitled APPARATUS FOR SKIVING REINFORCED HYDRAULIC HOSE.

BACKGROUND OF THE INVENTION

In Application Ser. No. 209,628, now U.S. Pat. No. 3,759,121 a machine is described which is capable of removing the outer resilient covering from a reinforced hose. The machine is portable and includes means for axially or longitudinally moving a rotating cutting head along a portion of the fixed reinforced hose during the skiving operation. The disclosed machine does not include means for cleaning the end portion of the skived hose or for removing particulate debris attendant to pre-cutting from the inner diameter thereof.

In the past, separate operations were required to prepare a reinforced hose for receipt of a coupling member or the like. First, a saw-cutting operation was performed to produce a hose segment of the proper length with a squared-off end portion. Next, a skiving operation was carried out to strip away the outer covering of the reinforced hose to produce a proper outer diameter for adoption of the fitting to the hose. Finally, a wash tank operation was performed to clean out the inside of the hose and to remove any particulate matter, such as rubber or metal shavings or powder, which deposited in the hose during the cutting operation.

It is an object of this invention to provide a machine which can skive the outer resilient covering from a piece of reinforced hose while simultaneously cleaning the end portion and inside diameter thereof.

It is a further object of this invention to provide a hose skiving machine having a vacuum means capable of eliminating a separate wash operation by drawing out particulate matter from the interior of the hose during the skiving operation.

Other objects and advantages of the present invention will become apparent from the following description and claims.

BRIEF DESCRIPTION OF THE DRAWINGS

FIG. 1 is an elevation view of the skiving and cleaning machine of the present invention illustrating the hose clamping means, the rotary cutting assembly, the fixed mandrel, the means for longitudinally moving the hose clamping means, and the automatic clamp release means;

FIG. 2 is a cut-away elevation view, similar to FIG. 1, showing an alternate means for longitudinally moving the hose clamping means;

FIG. 3 is an end view of a portion of the present invention taken along the line III—III in FIG. 1, showing the means for hose clamping for longitudinal movement thereof;

FIG. 4 is a view similar to FIG. 3 but taken along the line IV—IV of FIG. 2, showing an alternate means for longitudinally adjusting the clamping means;

FIG. 5 is an elevation view of the hollow hose receiving mandrel of the present invention;

SUMMARY OF THE INVENTION

Figure 6:
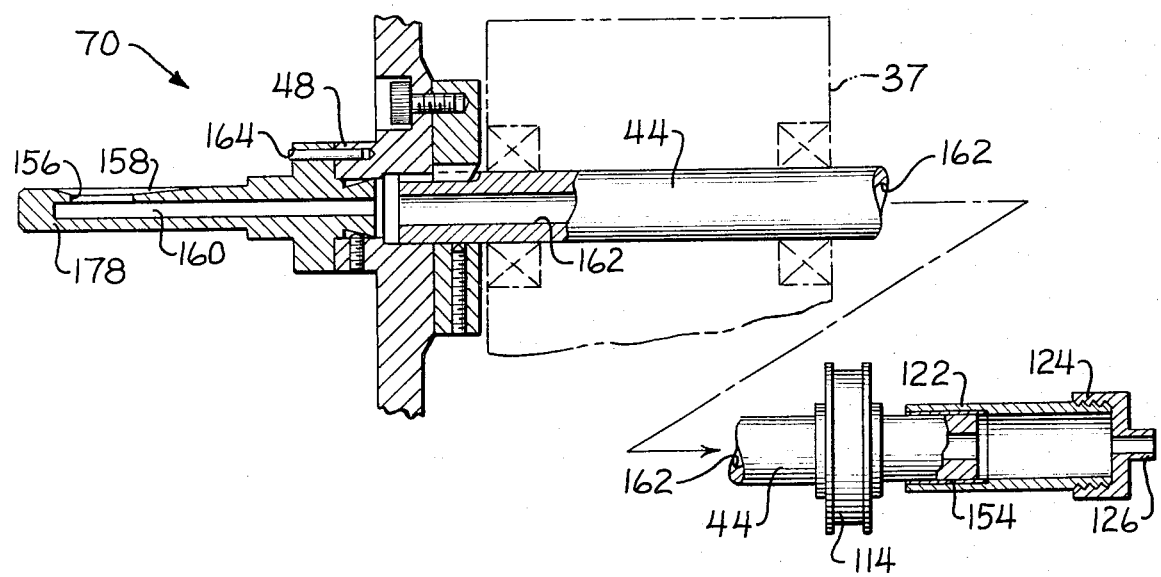
FIG. 6 is a partial section view of the hollow mandrel its connection to the vacuum means of the present invention.

The instant skiving and cleaning machine quickly and accurately skives the outer resilient covering from a reinforced hose to accommodate a hose coupling or other end fitting. Simultaneously with the skiving operation the inside diameter of the skived hose is vacuum cleaned by means of a hollow mandrel vacuum device over which the portion to be skived is fitted. The reinforced hose is clamped by automatic means moveable with a longitudinally moveable clamping fixture integrated with the apparatus. After the combined skiving and cleaning operation has been completed, the longitudinally moveable clamping fixture is moved away from the longitudinally fixed rotating cutters and the hose is automatically released from the clamping means for removal from the machine.

DETAILED DESCRIPTION

With reference to FIG. 1 in the drawings, a portable support table 112 for mounting the various elements of the apparatus is shown. A bearing block 37 rotatably supports a drive shaft 44 for a rotary cutting assembly shown generally at 42. The cutting assembly is fixedly mounted upon the support table 112 by means of a support member 110 and base 32. An air operated drive motor 18 is provided and is mounted to an under portion of the table 112. The drive motor is drivingly connected to the drive shaft 44 by means of a belt 116 and pulleys 114 and 118. Drive shaft 44 is rotatably supported at one end portion thereof within a sleeve 122 which sleeve is secured to a steady rest 120 rigidly mounted upon the base 32. The sleeve 122 is closed by means of threaded cap 124 which has a centrally located nipple 126 for connection with a suction conduit 128, the function of which will be more fully explained hereinafter. A clear view of the arrangement is provided in FIG. 6. The conduit 128 leads to a reservoir 129 for a vacuum means 130 which may be of conventional design or may be a part of an integrated shop vacuuming system.

The hose clamping means or fixture is shown generally at 165. It consists of an air operated clamping mechanism 166 for holding the reinforced hose to be skived, shown in phantom in 15. The clamping mechanism 166 is attached to a base plate 150 which is in turn mounted upon a pair of spaced-apart bearing blocks 136 which are longitudinally moveable along the axis of the machine upon a pair of guide rods 36 which rods are supported upon the table 112 by means of clamps 132. The clamping fixture 165 is manually moveable along the rods 36 by means of the application of force to a U-shaped handle 168, shown clearly in FIG. 3.

The clamping means is actuated by means connected with a low pressure air source as might be commonly employed in a shop, shown generally at 170. Such air is commonly filtered and regulated at 7 and supplied to a conduit 14 from whence it passes to branch conduits 172, 174, and 176. These branch conduits communicate respectively with a manual shut-off valve 16, a shut-off valve 178, and a cam-operated four-way air control valve 180. Conduits 182 and 184 lead from the valve 180 to air fittings 186 and supply air to the cylinder 208 in the clamping mechanism 166 to actuate the jaw 204.

With particular reference to FIG. 3, it will be noted that the guide rods 36 support the bearing blocks 136 and render support for the base plate 150 upon which is mounted the clamping fixture 165, as previously described. Adjustment bolts 200, one of which is shown, are provided for vertical positioning of the hose 15 relative to the mandrel 78. Such adjustment bolts are threaded into the base plate 150 and moveable therewith. The hose 15 when clamped, is held firmly between the jaws 202 and 204. Jaw 202 is adjusted by means of bolt 206 and jaw 204 moves in response to the actuation of air cylinder 208 toward and away from jaw 202.

The air cylinder 208 is held retracted when bearing block 136 is positioned in contact with a proximity switch or actuator 188 since this switch causes the valve 180 to supply air to the rod end of the cylinder via the conduit 184. At such time, the head end of the air cylinder is vented to atmosphere by the conduit 182 and an exhaust port (not shown) in the valve 180. Movement of the bearing blocks 136 rightwardly away from the brackets 132 (in FIG. 1) permits the proximity switch 188 to reposition the valve 180 so as to reverse the operation of the cylinder 208 and cause the hose to be clamped. With the hose clamped, the head-end of the air cylinder is air supplied by conduit 182 and the rod end thereof is exhausted via the conduit 184 and appropriate valving.

In an alternate arrangement shown in FIG. 2 the apparatus is essentially the same as that shown and described with reference to FIG. 1 except for the means for longitudinally moving the clamping fixture 165. With particular reference to FIGS. 2 and 4, a rack 134 is located beneath the base plate 150 and between the spaced bearing blocks 136. A pinion gear 140 is fixed upon a shaft 144 which extends transversally through the support table 112 beneath an upper surface thereof. The pinion engages the rack 134 for longitudinal movement thereof together with the clamping fixture upon movement of an operating lever 146.

The modified translating means shown in FIGS. 2 and 4 operates in essentially the same fashion as the means shown in FIGS. 1 and 3 except that translation occurs under the indirect influence of the rack and pinion through the lever 146 as opposed to under the direct influence of the handle 168. It should be noted that the shaft 144 extends laterally through sub-surface bracket means 210 and 212 which are fixed to the table 112. The pinion gear 140 and gear hub 142 reside between the laterally spaced brackets 212 and pinion 140 extends radially through an opening in the table surface for engagement with the rack 134.

FIG. 5 presents an enlarged view of the hose pilot means 70 taken along the curved line V—V of FIG. 1. It will be noted that the mandrel 78 has an opening 156 which leads to a tapered recess 158 and inter-communicates with a bore 160. A dowel hole 164 (clearly shown in FIG. 6) is provided for locating the pilot means 70 upon a base member 48.

Figure 7:
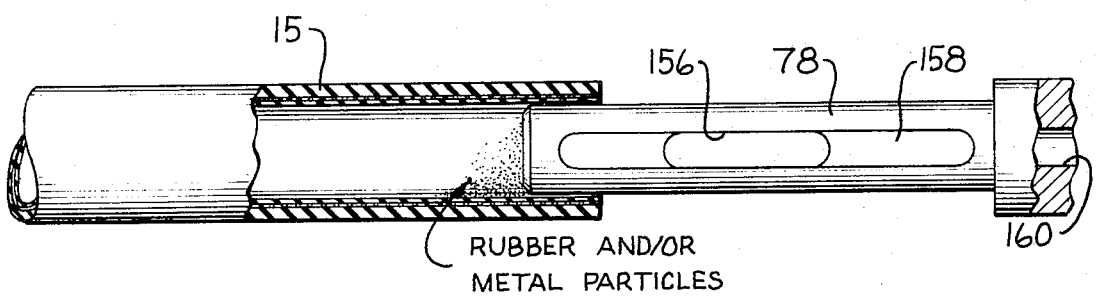
FIG. 7 is an enlarged partial view of the hollow mandrel shown receiving an end portion of reinforced hose to be skived.

FIG. 6 shows the pilot means adapted for connection to the vacuum means. The drive shaft 44 has a bore 162 therethrough which communicates with the bore 160 in the mandrel 78. The sleeve 122 is lined wih bearing material 154 which allows facile rotation of the drive shaft therein. member FIG. 7 illustrates the inter-communication of an operatively disposed piece of reinforced hose 15 and the hollow mandrel 78. The figure also illustrates the location of particulate matter within the hose and the manner in which the vacuum means can evacuate such matter from the inner portion of the hose.

Operation

In use, the valves 16 and 178 are manually conditioned to actuate the motor 18 and to power the vacuum means 130. The motor 18 drives the rotary cutting assembly shown generally at 42. The details of the cutting assembly, per se, are described in the aforementioned U.S. Application Ser. No. 209,628.

In FIG. 1, the clamping fixture 165 is disposed in the position occupied during insertion of a hose 15 and prior to the skiving and cleaning operation. In this position, one of the bearing blocks 136 is in actuating contact with the proximity switch 188 and the valve 180 is positioned such that air is supplied to the clamping mechanism 166 to hold the jaws 202 and 204 apart.

After the operator has inserted the hose 15 in the fixture and properly placed the guide bolt 200, he then extends the fixture longitudinally a predetermined amount towards the mandrel 78 by exerting a rightwardly directed force upon the handle 168. This movement causes the bearing blocks 136 to move upon the guide rods 36 and to disengage the proximity switch 188. This causes an automatic shift of the valve 180 to actuate the clamping mechanism 166 to firmly grip the hose 15.

Continued rightward movement of the fixture 165 causes the inside diameter of the hose 15 to contact and slip over the mandrel 78 (see FIG. 7) and to enter the rotating cutting means 42 wherein the cutter assembly 54, 56 would skive a predetermined length of external rubber sheathing from the hose. Concurrently with the skiving process, a vacuum produced by the vacuum means 130 and transmitted to the mandrel 78 removes any rubber or metal particles which might have lodged therein during the saw-cutting operation. The disposition of such particles is clearly shown in FIG. 7. When the end portion of the reinforced hose 15 comes into contact with a stop means on the mandrel 78, the skiving and cleaning operation is complete. At this point, the operator urges the handle 168 (or lever 146) leftwardly until one of the bearing blocks 136 again comes into contact with the proximity switch 188 to cause the valve 180 to shift to a position which unclamps the mechanism 166 for release of the hose 15. The apparatus is then automatically conditioned to receive an unskived hose section for another operation.

In view of the foregoing, it should be apparent that the present invention provides a vastly improved and efficient combination skiving and cleaning machine for preparing reinforced hose. The instant apparatus effectively eliminates a time consuming manufacturing step. The savings in terms of time and expense resultant from such elimination are apparent.

While the invention has been described with particular reference to the preferred embodiments, it is apparent that variations and modifications are possible within the spirit of the inventive concepts. For instance, while the present apparatus has been described as utilizing shop air as a source of power, electrical or hydraulic means could obviously be employed to operate the elements 18, 130 and 166. It is also possible to combine various sources of power to actuate the various functional elements of the apparatus. No limitation with respect to such limitations and modifications is intended, except by the purview of the appended claims.

We claim:

1. A machine for cleaning and skiving reinforced hose which has a reinforcing layer covered by a resilient layer, comprising; rotary means having an open central area for receiving said hose, drive means for rotating said rotary means, pilot means for supporting said hose within said open central area, cutter means mounted upon said rotary means and extending radially outwardly of said hose on diametrically opposite sides thereof, clamping means for clamping said hose to be skived, travel means for moving said clamping means longitudinally toward said cutter means and said pilot means while said drive means rotates said rotary means, vacuum means for cleaning the interior of said hose, whereby said resilient layer is skived progressively longitudinally off of said hose while said vacuum means simultaneously cleans said interior of said hose.

2. The invention of claim 1 wherein said clamping means include gripping means for holding said hose fixed against rotation while said clamping means moves longitudinally toward said cutter means and said cutter means rotates about said hose.

3. The invention of claim 2 wherein said cutter means include slide block means which are slideable radially inwardly and outwardly of said hose and which are mounted upon said rotary means, said slide block means being positively biased radially inwardly by biasing means.

4. The invention of claim 3 wherein sad cutter means further include a cutter member having an axis running parallel to a first radius of said hose, said cutter member being adjustably mounted upon a portion of said slide block means, said slide block means being slideable upon said rotary means along an axis of said slide block means which runs parallel to a second radius of said hose.

5. The invention of claim 4 wherein said second radius is advanced angularly approximately thirty degrees ahead of said first radius in the direction of rotation of said rotary means.

6. The invention of claim 5 wherein said cutter member has a cutting edge portion and a heel portion and wherein said cutting edge portion is disposed above and away from said reinforcing layer of said hose when said heel portion is in contact therewith such that said cutting edge portion cannot cut said reinforcing layer.

7. The invention of claim 3 wherein said pllot means are provided for centering said hose with respect to said rotary means and wherein stop means are provided on said slide block means, which stop means engage a portion of said pilot means to preclude further inward movement of said slide block means.

8. The invention of claim 1 wherein said pilot means include hollow mandrel means for directly engaging an interior portion of said hose, said vacuum means including a vacuum source and means for communicating said source with said hollow mandrel means.

9. The invention of claim 1 wherein said clamping means is slidably mounted upon table means for sliding longitudinal movement toward and away from said cutter means and wherein said travel means include manual actuator means for transmitting manually applied force to said clamping means for movement thereof.

10. The invention of claim 9 wherein said actuator means include a rack mounted upon said clamping means for movement therewith and a pinion gear rotatably mounted within a portion of said table means for engaging said rack and imparting motion thereto and lever and shaft means connected to said pinion gear for selective rotation thereof.

11. The invention of claim 9 wherein said actuator means include a U-shaped hand bar attached directly to a portion of said clamping means for movement therewith.

12. The invention of claim 2 wherein said gripping means include at least one jaw member movable into and out of gripping engagement with said hose, said jaw member being responsive to the selective actuation of clamping motor means.

13. The invention of claim 12 wherein said clamping motor means include a piston connected to said jaw member, said clamping means being longitudinally movable between first and second spaced-apart extreme positions, said first position being occupied when said hose is placed within said clamping means and said second position being approached when said hose is being skived and cleaned, said clamping motor means further including proximity switching means engagable by said clamping means when said clamping means is disposed in said first position for causing said piston to move said jaw member out of gripping engagement with said hose.

14. The invention of claim 8 wherein said drive means include a drive shaft having axial bore means therein for communicating with the hollow interior of said mandrel means, said means for communicating said source with said mandrel means including conduit means and bearing sleeve means for rotatable supporting said drive shaft while communicating said source with said axial bore means.

15. The invention of claim 8 wherein said hollow mandrel means has radially disposed opening means for communicating the hollow interior of said mandrel with the interior of said hose.

16. The invention of claim 13 wherein said proximity switching means is automatically operative upon movement of said clamping means away from said first extreme position to actuate said piston to move said jaw member into engagement with said hose.

* * * * *